United States Patent [19]

Lewis et al.

[11] Patent Number: 5,236,478
[45] Date of Patent: Aug. 17, 1993

[54] LINT TRAP UNIT

[76] Inventors: Keith B. Lewis, 2410 Lambourne Ave., Salt Lake City, Utah 84109; Stewart M. Bradford, 11342 S. Woodhill Dr., Salt Lake City, Utah 84092

[21] Appl. No.: 10,363

[22] Filed: Jan. 28, 1993

[51] Int. Cl.⁵ .............................. B01D 59/50
[52] U.S. Cl. .................................. 55/319; 55/492; 55/495; 55/506; 55/511; 34/82
[58] Field of Search ............... 34/79, 82, 83, 84; 55/319, 467, 493, 495, 506, 511, 492

[56] References Cited

U.S. PATENT DOCUMENTS 3,487,624  1/1970  Tignanelli .................. 55/511 X
3,999,304 12/1976  Doty ............................ 34/82

Primary Examiner—Charles Hart
Attorney, Agent, or Firm—M. Ralph Shaffer

[57] ABSTRACT

A lint trap unit for fabric dryers, constructed for passive, slow-flow quiescent-zone precipitation of a majority of lint and other foreign particulates entrained in the exhaust of the dryer, and also providing for secondary filter recovery of possibly unprecipitated residues at an upper filter that is provided.

4 Claims, 3 Drawing Sheets

LINT TRAP UNIT

FIELD OF INVENTION

The present invention relates to lint traps for fabric dryers such as standard household and commercial clothes dryers and, more particularly, to a new and improved lint trap unit which emphasizes drastically reduced air flow within the cabinet of the unit preceding an incorporated filter tray, when employed, so as to allow for an effectual precipitation on entrained moisture, lint, and other particles to the bottom of the container even before the air flow, of drastically reduced velocity, approaches the filter tray used in the invention, employed for secondary recovery of foreign particulates.

BRIEF DESCRIPTION OF PRIOR ART

Clothes dryers and other types of fabric dryers conventionally self-contain some type of inexpensive lint trap. These are commonly only coarse filters, inexpensive in construction and very modest in operation effectiveness. It is the frequent experience of users of clothes dryers in the home and especially in commercial establishments, for example, that the exhaust flex conduit, normally four-inch standard, spiral-wound plastic conduit frequently becomes filled with lint and other foreign particulates coming from the exhaust of the dryer. These hoses must be laboriously cleaned out and frequently replaced. The problem is compounded by the fact that moisture entrained with the lint in the outgoing airstream from the dryer collects on the inside of the exhaust conduits or hoses so as to cause the lint to stick to the interior of walls of such hoses. This makes matters worse. Certain prior efforts have been made to have independent filters, separate and apart from the dryers themselves, coupled to the exhaust force of the dryers and used to collect lint before the same enters the primary exhaust conduit of the building. Certain U.S. patents are known which bear generally upon the subject at issue, which patent numbers are given below, as follows U.S. Pat. Nos.:
1,133,047
3,999,304
2,825,148
3,487,624

None of the above patents teach apparatus, Sufficiently large and appropriately constructed, allowing for and in fact generating a preliminary precipitation or dropping out of lint and other foreign material from the incoming air stream in an essentially quiescent zone within the unit. This, however, is accomplished by the particular construction of the filter trap unit in the present invention so that a majority of lint actually falls out within the quiescent zone of the unit to collect at the bottom thereof.

The above U.S. patent, last mentioned, has a vertical exhaust for the the air-stream. This, however, only increases the updraft pressure gradient within cabinet structure so as in fact to accelerate the flow of exhaust air with entrained moisture particles and lint, thus defeating precipitation of lint before any filter area is reached, and thus tending to further complicate the lint trap function.

Other disadvantages of the prior art are inconvenience and maintenance and assembly, a multiplicity of needed constructions for stacking multiple filters, and so forth.

BRIEF DESCRIPTION OF THE PRESENT INVENTION

At the outset, the invention addresses the central point of the average dryer experiences a rate of flow of its exhaust approaching 168 to 170 cubic feet per minute. This is exhausted through a standard four inch cylindrical conduit and represents a substantial force of incoming entrainment air. What therefore is needed and which is provided in the present invention is a drastic slowing down of the dryer exhaust within the trap unit, this through substantial enlargement, especially vertically, of the unit, and this to provide a substantial zone beneath the filter used so that a quiescent dropping-out of lint is made possible; to effect this result the filter screen and horizontal cross-section of the unit are such that their cross-sectional area screen is at very least ten times the cross-sectional area of the inlet port accommodating the dryer and, preferably, many more times the cross-sectional area, i.e., perhaps at least 15 to 20 times such area. Where the filter tray forms a horizontal upper-intermediate partition in the cabinet, then the volumetric area below the filter screen is sufficiently large such that incoming air is drastically slowed down as to velocity and, before upward expulsion through the filter tray, enters an essentially quiescent zone that actually permits a dropping out or precipitation of lint and even moisture theretofore entrained in the incoming air for the dryer.

Accordingly, the cabinet incorporating the filter screen and the upper portion thereof is constructed such that a horizontal level of reduced pressure is experienced immediately above the inlet part of the cabinet and substantially beneath the filter tray. Furthermore, to establish the quiescent zone desired, the flange of the inlet port is disposed very close to the bottom of the cabinet and certainly within the lower one-fourth of the cabinet beneath the filter tray. The outlet port of the unit's cabinet is disposed, of course, above the filter tray incorporated but at a side or end rather than at the top of the unit. In this way the exhaust draft pressure gradient is minimized; over-all, essentially clean air is exhausted in a horizontal direction from the cabinet.

The cabinet is supplied an access door which serves clean out purposes. The air-flow within the cabinet beneath with the filter tray is drastically reduced as to velocity, so as to effect particulates' precipitation as before mentioned, and also produces a subdued air movement near the front of the cabinet so that the majority of the lint collects proximate the clean-out door supplied.

The filter tray is a slide in type of tray that is easily removal for cleaning purposes. The filter mesh used may be either glued or otherwise secured to the tray frame of the filter tray, or a mesh sleeve resembling a lady's stocking material, for example, can be pulled over the horizontal, thin filter tray frame.

Accordingly, the dryer supplied the lint trap unit exhausts its hot moist air there-through and outwardly to conduit leading to the exterior of the building; in dry climates, the lint trap unit can simply exhaust air into a living area.

During the course of dryer operation, the initial moist air produces moisture accumulations within the lint trap cavity; these become vaporized when the dryer air remains hot but becomes progressively more dry. The vaporized moisture and the lint and any slight lint that remains lifts to a secondary filter, i.e. the filter tray, so that essentially totally clean air is expressed from the trap unit. Again, the vast majority of lint drops out in the cabinet beneath the filter tray employed even before the lint reaches the filter area. Any minor portion of lint that remains in the airstream is finally caught by the mesh supplied the filter tray.

OBJECTS

Accordingly, a principal object of the present invention is to provide a new and improved filter trap unit for dryers.

A further object is to provide a filter trap unit the construction of which is such as to enable a dropping out or precipitation of lint and other foreign materials from the incoming air stream of a clothes dryer, for example, just before final or secondary removal of any lint as remains present in the incoming air stream before it proceeds through a mesh filter tray as provided.

A further object of the invention is to provide a new and useful filter trap unit wherein the size and design of the unit is such as to drastically reduce the speed of dryer exhaust, entraining vapor and lint flow, whereby an essentially quiescentent zone is established, whereby to permit a dropping out of a majority of lint, moisture, and other foreign particles in the incoming air stream directly to the bottom and preferably to the front of the unit provided.

A further object is to provide a dryer lint trap combination wherein the lint trap can be separately serviced and made sufficiently large so as to accomplish a high efficiency of lint removal without substantially adding to the size of the dryer.

An additional object is to provide for substantial removal of both moisture and lint, as well as other foreign particles, from the incoming airstream constituting the exhaust of the gas dryer, this such that a majority of dropping out or precipitation of lint and other materials is achieved even prior to the secondary action of the lint tray incorporated in the unit.

An additional object is to provide a lint trap cabinet having a convenient access and clean out door as well as a slidable filter tray.

IN THE DRAWINGS

The present invention may best be understood by reference to the following detailed description, taken in conjunction with the following drawings in which.

DETAILED DESCRIPTION OF PREFERRED EMBODIMENTS

Figure 1:
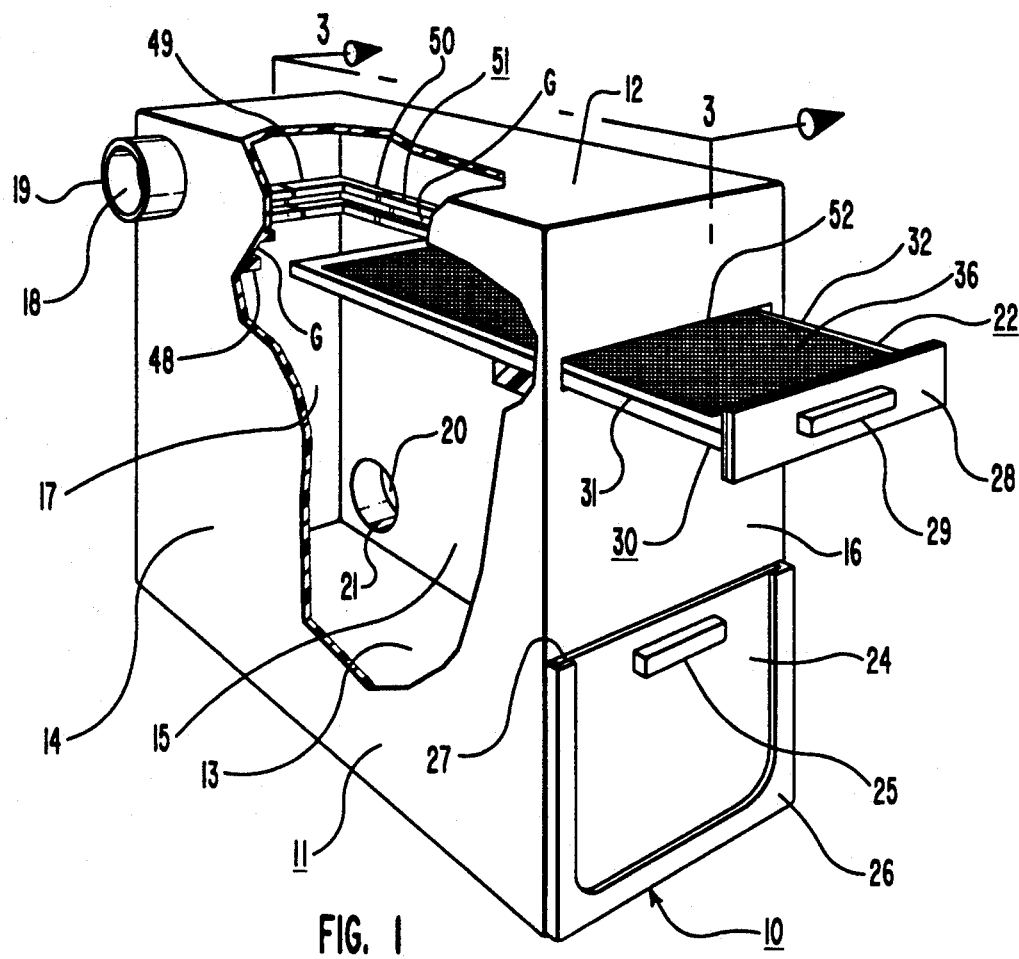
FIG. 1 is a perspective view, partially broken away, of a filter unit constructed in accordance with the principles of the present invention.

In FIG. 1 filter unit 10 includes a container or cabinet 11 having top 12 bottom 13, opposite sides 14 and 15, and also front and rear panels 16 and 17 defining an enclosure or open interior.

Side 14 is provided an outlet or exhaust port 18 which is formed by cylindrical flange 19. Correspondingly, side 15 is provided with a lower inlet port 20 defined by cylindrical flange 21.

At this juncture it is important to note that the inlet port is disposed at a side of the cabinet which is proximate to or very near the bottom 13. In particular, such inlet port is horizontally disposed and in its entirety must be confined to the lower one forth of the vertical dimension of the cabinet beneath the filter tray 22. The purpose for this will be described hereafter. Correspondingly, it is important to note that the outlet or exhaust port 18 is disposed above the filter tray location and proceeds horizontally from the cabinet. The location of the flange 19 with its associated exit port 18 should not be found in the top 12 since the vapors and lint proceeding from the dryer and entering into inlet port 20 would otherwise experience an updraft leading upwardly to the exit port where the same located on the top of the unit. Instead, and to slow down the vapor flow, it is important that the exit port 18 be disposed beneath the top 12 and proceed outwardly, essentially horizontally, from one of the sides of the unit or, conceivably, from the back or even the front panel. However, for optimum operation, the flange 19 forming exit port 18 should be disposed at a side opposite from the side incorporating the inlet port 20.

The front panel 16 includes an opening 23 which is selectively closed by slide door 24. Slide door 24 includes a pull handle 25 for selectively lifting the slide door and removing collected lint from bottom 13 of the cabinet 11. A U-shaped inwardly recessed plate 26 is provided, and is secured about the periphery of opening 23 against front panel 16 of the cabinet. A U-shaped groove 27 is provided, proceeds about the inner surface of door channel plate 26, and supplies a slide path for slide door 24. Accordingly, the slide door is simply dropped into the U-shaped channel groove 27 for closure of opening 23. When the door is to be opened then the slide door proceeds upwardly and can be conveniently removed, this by actuation of handle 25. It is possible that the door might comprise a hinged door that is preferably hinged to the bottom of the unit. However, the slide door 24 shown is much preferred.

Figure 3:
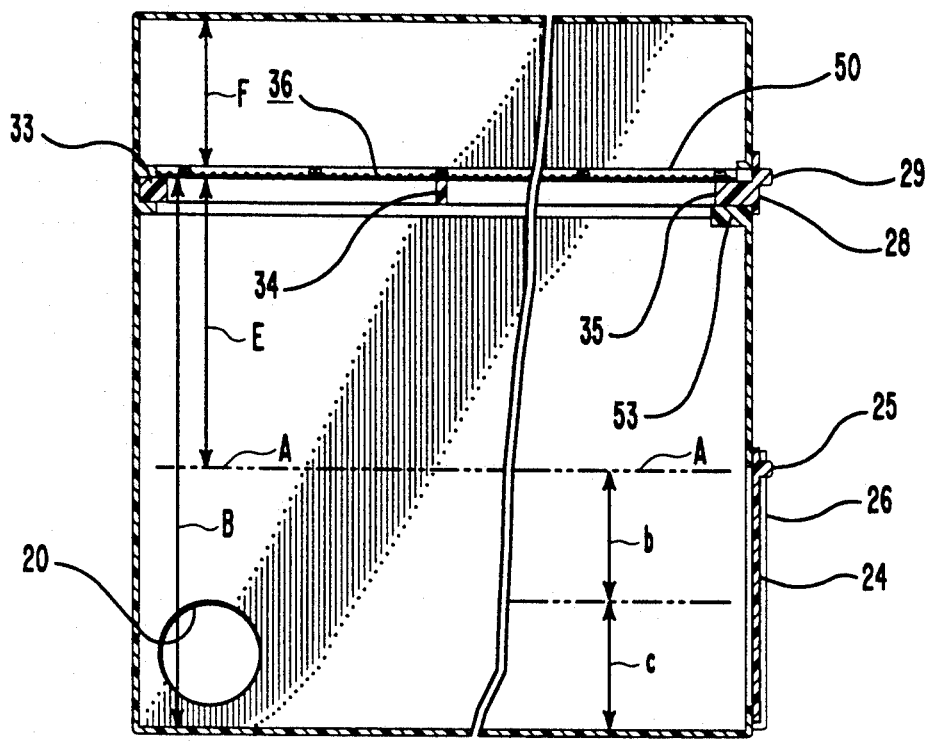
FIG. 3 is a longitudinal vertical section, taken along the line 3—3 in FIG. 1, and is shortened and cut away for convenience of illustration.
Figure 5:
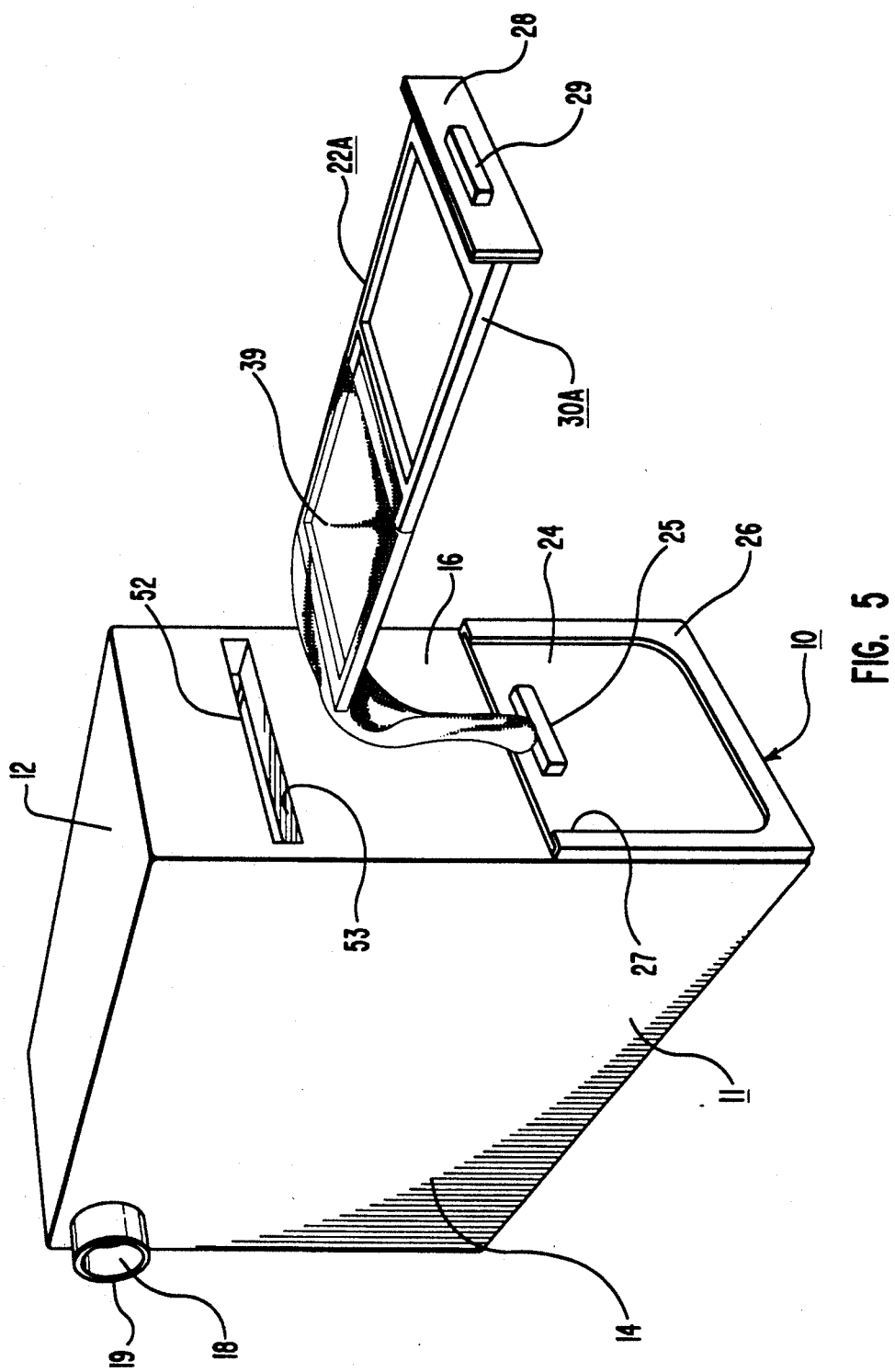
FIG. 5 is similar to FIG. 4 but illustrates that the filter tray may be constructed as a frame incorporating a sleeve-configured mesh element that slips over the end of the tray.

Filter tray 22 includes a front drawer panel 28 provided with pull handle 29. Extending forwardly from and attached to panel 28 is a tray frame 30. Tray frame 30 has is a pair of longitudinal members 31 and 32 and also intermediate cross bars 33-35, see FIG. 3. An alternate filter tray 22A, having frame 30A, is seen in FIG. 5. The only difference between the two trays is that filter tray 22 in FIG. 1 simply incorporates at its top surface a filter mesh or filter screen 26 which can be glued in place to the upper surfaces of the tray frame elements associated with tray frame 30. Thus, as to tray 22 the longitudinal members 31 and 32 together with the cross bar structure at their upper surfaces may supply to support in gluing surface for the screen or mesh 36. Relative to filter tray 22A in FIG. 5, a sleeve of mesh material, which can resemble a lady's stocking, can be simply slipped over the tray frame 30A, corresponding to frame 30 in FIG. 1. The filter sleeve is identified in FIG. 5 as element 39. Accordingly, in FIG. 5 a sleeve 39, composed of mesh material, provides both upper and lower filter-trap surfaces. The sleeve can be conveniently slipped off the frame for cleaning in any convenient manner.

As to the filter mesh or filter screen in FIGS. 1 and 5, the same will have mesh or screen sizes of the order of 10 to 40 microns, by way of example. The mesh material of such porosity is conventionally used in silk screening and for other purposes, by way of example.

Figure 2:
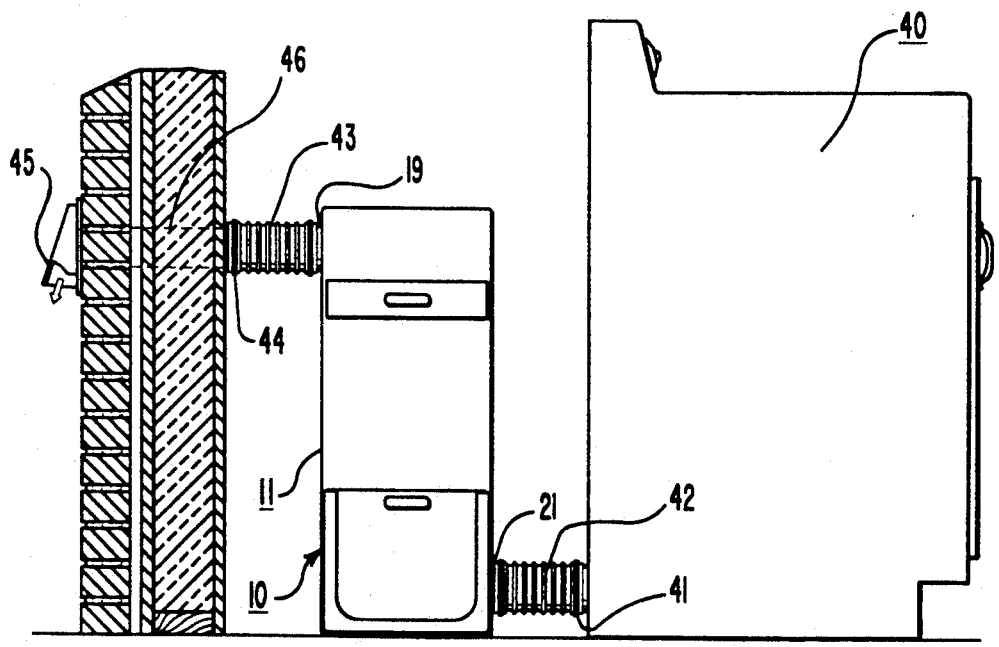
FIG. 2 is a side elevation of a clothes dryer provided the filter unit of FIG. 1, the latter being vented to the exterior of a building.

In FIG. 2 dryer 40 has an exhaust flange 41 which is coupled by conduit 42 to inlet port cylindrical flange 21 of the cabinet 11 of unit 10. Circular flange 19, forming outlet or exhaust port 18 of unit 10, is provided with a conventional four-inch conduit 43 that leads to an exhaust flange 44.

Flange 44 may proceed through aperture 46 to connect to an outlet vent unit 45, constructed in a conventional manner. By way of example, the dryer 40 is vented through the filter trap unit of the present invention to conduit leading to the exterior of the building.

In certain instances, particularly in dry climates, it may be desirable simply to vent the subject filter unit directly into a living area. In such event, a filter cap 47, see FIG. 4, may be constructed of mesh material and disposed over the flange 19 of the exhaust port.

FIG. 1 illustrates that the interior of the cabinet is provided with a series of channel elements. Channel elements 48-50 respectively form an interior channel support frame that is secured at its outer surfaces, or is molded relative to the interior of cabinet 11. This channel frame, which is designated in FIG. 1 as 51, is aligned with a slot opening 52 and receives the filter tray 22, or 22A that slides into composite channel groove G formed by channel elements 48-50. To the base of opening 52 is a support crossbar 53 which can be secured to or simply molded into the cabinet structure. This will support the front end of crossbar portion 35 of the tray frame 30.

Accordingly, the filter tray 22 is easily inserted into the front or front panel of cabinet 11 and proceeds through opening 52 into the composite groove G of the channel construction, this for supporting filter tray 22 when the same is in place. The filter tray 22 is easily withdrawn by the user simply pulling the tray out of groove G by use of handle 39. Panel 28 shuts off the opening 52 from the exterior, when the filter tray 22 is in closed position, thereby to prevent leakage relative to the upper chamber of the cabinet which is above the filter tray.

In operation, and as will be pointed out further hereafter, line A—A will signify a line at which minimum pressure will exist. As to the cabinet interior, the same will have a lower chamber B, for use with the filter screen, and an upper chamber F, above the filter screen. Chamber B provides chamber portions b, c and E as indicated. Chamber portion c defines a lower portion of the cabinet nearest bottom 13 which receives inlet port 20, the upper boundary of portion c defining essentially the upper extremity of the aperture of port 20. Portion c is chosen to be one fourth or less of the distance from the bottom of the cabinet to the filter screen, i.e., one-fourth or less of distance B relative to the lower chamber. This is to allow for the development of an essentially quiescent zone between inlet port 20 and the screen so as to allow lint and other foreign matter to settle out of the incoming air stream. Chamber portion b constitutes the remainder of the lower chamber beneath line A—A.

The horizontal cross sectional areas of the filter screen and cabinet must at least equal or exceed 10 times the transverse, vertical cross-sectional opening of inlet port 20. Both inlet and outlet ports will be supplied a conventional four-inch flexible conduit as commonly associated with the venting of dryers. The purpose for drastic enlargement of the cross-sectional area of the screen, and indeed, of the open area of the cabinet interior, is to provide for a drastic reduction in flow of incoming heated and moist air, carrying the entrained lint particles, so that the same can follow a flow pattern as is generally indicated by bottom airflow path arrow H in FIG. 4. Thus, the incoming air proceeds from the inlet port and then progressively loses speed as the same proceeds upwardly along path H to a forward portion of the cabinet. In fact, it has been seen through experimentation that the motion of the air stream is substantially reduced, especially proximate the interior area proximate door 24, so that in fact the lint will slowly swirl and gradually form a lint ball near the slide door 24. Accordingly, the user can easily raise the slide door and reach in to expel the lint ball and also any other lint accumulations at the bottom of the cabinet. Again, the vertical enlargement of the space enclosure of the cabinet and the height of the filter screen relative to inlet opening, in combination of the horizontal exit of the cabinet, provides for an essentially quiescent zone wherein the air within the cabinet moves very, very slowly so as to drop out the lint even before the same reaches the filter screen.

Should the gently rising air still contain entrained lint, the same is captured by either the filter screen at 36 in FIG. 1 or the filter screen sleeve at 39 in FIG. 5.

Figure 4:
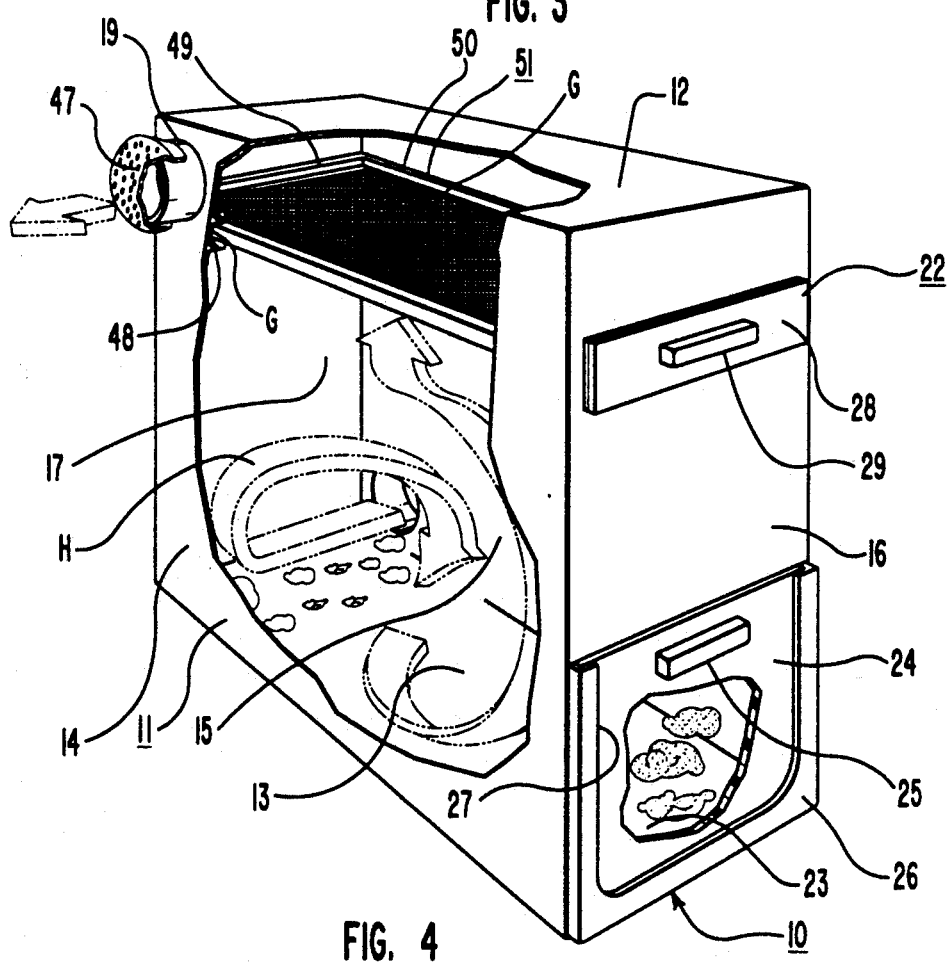
FIG. 4 is a perspective view of the structure of FIG. 1 and is partially broken away to illustrate the flow path of incoming vapor with entrained lint, the flow path leading upwardly to the filter tray provided the unit.

It is conceivable that in some applications the filter screen might even be eliminated since the vast majority of lint coming into the unit essentially settles out, precipatates, and thus drops out to the bottom before the air even reaches a filter tray 22. In such event, and especially where the container is to be vented directly in the room, then a possible precaution of use of the mesh filter cap 27 as in FIG. 4 is suggested. The air that proceeds through the filter screen of course will be exhausted out the flange 19.

Again, for proper operation of the filter trap cabinet, it is essential that incoming moist air from the dryer be introduced into the cabinet at the bottom, e.g., through a side panel as seen in FIG. 1. Correspondingly, the exhaust or outlet port at 18 should proceed from the top above the filter area and in a direction horizontal and not vertical. This is to ensure that there is no updraft to accelerate the flow of the heated moist air within the cabinet. Also, when the exhaust flow is also horizontal from the cabinet, then the moisture in the air itself within the cabinet tends to drop out and accumulate at the bottom of the cabinet, this with the lint; as the drying operation proceeds and the incoming air becomes less moist and in fact almost dry, and such dry air will tend to vaporize any moisture collecting along the sides and bottom of the cabinet so as to exhaust the moisture as water vapor for entrainment into the air proceeding upwardly through the screen and out the exhaust port.

Where the use of a tray is eliminated, then the reduced pressure area will occur at approximately line A—A. This line of reduced, quiescent condition air pressure within the cabinet will be lowered dimensionally when the filter screen is introduced, since the screen, though porous, will cause a very slight build-up of pressure directly beneath the screen. The magnitude of pressure build-up will depend upon the degree of porosity of the screen material, i.e. its mesh size and so forth.

Accordingly, the present invention provides a filter trap unit to be used by commercial and home electric and gas dryers of fabrics, and this in a manner so as to increase the life of the dryer and provide a trap for lint such that the conduit proceeding to the exterior of the building, or otherwise, will be almost completely free of lint or other foreign matter. This eliminates the necessity otherwise present of periodically cleaning conduits leading from fabric dryers.

While particular embodiments of the present invention have been shown and described, it would be obvious to those skilled in the art that various changes and modifications will be made without departing from the essential aspects of this invention and therefore, the aim in the appended claims is cover all such changes and modifications as follows in the true spirit and scope of the invention.

We claim:

1. A passive lint trap for capturing lint entrained in an incoming air stream, said lint trap comprising: upstanding structure having a top and a bottom and having an open interior, said structure having an essentially horizontal inlet port proximate said bottom and communicating with said interior for receiving said air stream and an essentially horizontal outlet port communicating with said interior proximate said top for expelling said air stream which is essentially free of lint from said structure, said structure being dimensioned such that the transverse horizontal cross-section of said interior beneath said outlet port is in excess of ten times the transverse cross-section of said inlet port, whereby to cause the lint entrained in said air stream to settle and precipitate out, in an essentially quiescent zone within said enclosure and beneath said outlet port, and thereby produce an air stream passing through said outlet port which is essentially lint-free.

2. A passive lint trap for capturing lint entrained in an incoming air stream, said lint trap comprising: an upstanding cabinet having a top, bottom, and sides defining an open interior, and also a clean-out access opening proximate said bottom, said cabinet having a door removably exposing said access opening for clean-out purposes, and cabinet having an essentially horizontal inlet port proximate said bottom, separate from said access opening and communicating with said interior, for receiving said air stream and an essentially horizontal outlet port communicating with said enclosure proximate said top for exhausting said air stream which is essentially free of lint from said structure, said cabinet having a horizontal slot, nearer to said outlet port than said inlet port, and also interior filter tray support structure beneath and contiguous with said slot, a mesh-provided filter tray means removably positioned through said slot to rest upon said support structure and thereby defining a porous partition within said interior of said cabinet, said cabinet being dimensioned such that the transverse horizontal cross-sections of at least a portion of said cabinet interior and said filter tray means beneath said outlet port are in excess of ten times the transverse cross-section of said inlet port, whereby to cause a majority of lint entrained in said air stream to settle and precipitate out, in an essentially quiescent zone within said cabinet interior at said portion and beneath said outlet port and filter tray means, said filter tray means effecting the capture of any remaining lint, to thereby produce an air stream above said filter tray means and passing through said outlet port which is essentially lint-free.

3. A passive lint trap for capturing lint entrained in an incoming air stream, said lint trap comprising: an upstanding cabinet having a top, bottom, and sides defining an open interior, and also a clean-out access opening proximate said bottom, said cabinet having a door removably exposing said access opening for clean-out purposes, and cabinet having an essentially horizontal inlet port proximate said bottom, separate from said access opening and communicating with said interior, for receiving said air stream and an essentially horizontal outlet port communicating with said enclosure proximate said top for exhausting said air stream which is essentially free of lint from said structure, said cabinet having a horizontal slot, nearer to said outlet port than said inlet port, and also interior filter tray support structure beneath and contiguous with said slot, a mesh-provided filter tray means removably positioned through said slot to rest upon said support structure and thereby defining a porous partition within said interior of said cabinet, said filter tray means comprising a open frame and a filter-mesh sleeve disposed over said frame, said cabinet being dimensioned such that the transverse horizontal cross-sections of at least a portion of said cabinet interior and said filter tray means beneath said outlet port are in excess of ten times the transverse cross-section of said inlet port, whereby to cause a majority of lint entrained in said air stream to settle and precipitate out, in an essentially quiescent zone within said cabinet interior at said portion and beneath said outlet port and filter tray means, said filter tray means effecting the capture of any remaining lint, to thereby produce an air stream above said filter tray means and passing through said outlet port which is essentially lint-free.

4. A passive lint trap for capturing lint entrained in an incoming air stream, said lint trap comprising: an upstanding cabinet having a top, bottom, and sides defining an open interior, and also a clean-out access opening proximate said bottom, said cabinet having a door removably exposing said access opening for clean-out purposes, and cabinet having an essentially horizontal inlet port proximate said bottom, separate from said access opening and communicating with said interior, for receiving said air stream and an essentially horizontal outlet port provided a porous cover and communicating with said enclosure proximate said top for exhausting said air stream which is essentially free of lint from said structure, said cabinet having a horizontal slot, nearer to said outlet port than said inlet port, and also interior filter tray support structure beneath and contiguous with said slot, a mesh-provided filter tray means removably positioned through said slot to rest upon said support structure and thereby defining a porous partition within said interior of said cabinet, said cabinet being dimensioned such that the transverse horizontal cross-sections of at least a portion of said cabinet interior and said filter tray means beneath said outlet port are in excess of ten times the transverse cross-section of said inlet port, whereby to cause a majority of lint entrained in said air stream to settle and precipitate out, in an essentially quiescent zone within said cabinet interior at said portion and beneath said outlet port and filter tray means, said filter tray means effecting the capture of any remaining lint, to thereby produce an air stream above said filter tray means and passing through said outlet port which is essentially lint-free.

* * * * *